US010744962B2

(12) United States Patent
Dimmer et al.

(10) Patent No.: US 10,744,962 B2
(45) Date of Patent: Aug. 18, 2020

(54) ANTI-DRUMMING COMPOUNDS WITH HIGH MOLECULAR WEIGHT EMULSION POLYMERS

(71) Applicant: BASF SE, Ludwigshafen (DE)

(72) Inventors: Joerg-Alexander Dimmer, Mannheim (DE); Dirk Wulff, Schifferstadt (DE); Peter Preishuber-Pfluegl, Mannheim (DE)

(73) Assignee: BASF SE, Ludwigshafen (DE)

( * ) Notice: Subject to any disclaimer, the term of this patent is extended or adjusted under 35 U.S.C. 154(b) by 579 days.

(21) Appl. No.: 15/103,522

(22) PCT Filed: Dec. 5, 2014

(86) PCT No.: PCT/EP2014/076764
§ 371 (c)(1),
(2) Date: Jun. 10, 2016

(87) PCT Pub. No.: WO2015/086465
PCT Pub. Date: Jun. 18, 2015

(65) Prior Publication Data
US 2016/0311381 A1    Oct. 27, 2016

(30) Foreign Application Priority Data

Dec. 11, 2013 (EP) .................................... 13196734
Apr. 4, 2014 (EP) .................................... 14163585

(51) Int. Cl.
| | | |
|---|---|---|
| *C09D 133/12* | (2006.01) | |
| *B60R 13/08* | (2006.01) | |
| *C08K 3/30* | (2006.01) | |
| *C09D 7/61* | (2018.01) | |
| *C08K 3/013* | (2018.01) | |
| *C08F 220/14* | (2006.01) | |
| *C08K 3/26* | (2006.01) | |
| *B05D 3/00* | (2006.01) | |
| *C08J 3/02* | (2006.01) | |

(52) U.S. Cl.
CPC ............. *B60R 13/08* (2013.01); *B05D 3/007* (2013.01); *B60R 13/0861* (2013.01); *C08F 220/14* (2013.01); *C08J 3/02* (2013.01); *C08K 3/013* (2018.01); *C08K 3/26* (2013.01); *C08K 3/30* (2013.01); *C09D 7/61* (2018.01); *C09D 133/12* (2013.01); *C08J 2333/12* (2013.01); *C08K 2003/265* (2013.01); *C08K 2003/3045* (2013.01)

(58) Field of Classification Search
CPC ........ B05D 3/007; C09D 7/61; C09D 133/12; B60R 13/08; C08K 3/013; C08K 3/30; C08K 3/26; C08K 2003/3045; C08J 2333/12
USPC ....................................................... 427/385.5
See application file for complete search history.

(56) References Cited

U.S. PATENT DOCUMENTS

2005/0101697 A1 * 5/2005 Morihiro ................. F16F 9/006
523/201
2011/0060066 A1    3/2011 Yokota et al.

FOREIGN PATENT DOCUMENTS

| DE | 199 54 619 A1 | 5/2001 | |
|---|---|---|---|
| EP | 1520865 A2 † | 9/2004 | |
| EP | 1 520 865 A2 | 4/2005 | |
| EP | 1520865 A2 * | 4/2005 | ............ C08F 265/06 |
| EP | 1 930 388 A1 | 6/2008 | |
| EP | 2 295 517 A1 | 3/2011 | |
| EP | 2 420 412 A1 | 2/2012 | |
| JP | 2005-281546 A | 10/2005 | |
| JP | 2005-281576 A | 10/2005 | |
| JP | 2009270064 A † | 11/2009 | |
| JP | 2010-53210 A | 3/2010 | |
| JP | 2010-275546 A | 12/2010 | |
| JP | 2013-122046 A | 6/2013 | |
| JP | 2013199622 A † | 10/2013 | |
| WO | WO 2007/034933 A1 | 3/2007 | |
| WO | WO 2012/010632 A1 | 1/2012 | |
| WO | WO 2013/174611 A1 | 11/2013 | |

OTHER PUBLICATIONS

International Search Report dated Feb. 4, 2015 in PCT/EP2014/076764 (with English language translation).
International Preliminary Report on Patentability and Written Opinion dated Jun. 14, 2016 in PCT/EP2014/076764 (with English language translation).

* cited by examiner
† cited by third party

*Primary Examiner* — Hai Y Zhang
(74) *Attorney, Agent, or Firm* — Oblon, McClelland, Maier & Neustadt, L.L.P.

(57) ABSTRACT

A description is given of the use of a polymer dispersion for producing sound deadener compositions, the polymer dispersion comprising at least one polymer obtainable by emulsion polymerization of radically polymerizable monomers, and the polymer having a weight-average molecular weight of more than 100 000, preferably of more than 100 000 to 350 000. A description is also given of corresponding sound deadener compositions which comprise the polymer dispersion, and of a method for damping oscillations or vibrations of vehicle components.

6 Claims, 2 Drawing Sheets

Figure 1

Figure 2

ANTI-DRUMMING COMPOUNDS WITH HIGH MOLECULAR WEIGHT EMULSION POLYMERS

The invention relates to the use of a polymer dispersion for producing sound deadener compositions, the polymer dispersion comprising at least one polymer obtainable by emulsion polymerization of radically polymerizable monomers, and the polymer having a weight-average molecular weight of more than 100 000, preferably of more than 100 000 to 350 000. The invention also relates to corresponding sound deadener compositions which comprise the polymer dispersion, and also to a method for damping oscillations or vibrations of vehicle components.

Oscillations or vibrations of machinery or vehicle components generate unwanted noise. For noise reduction, the components can be treated with what are called sound deadener compositions, also referred to as LASD (liquid applied sound damping) compositions. Vibration-damping materials are described in, for example, Journal of Materials Science 36 (2001) 5733-5737, US 2004/0033354, and U.S. Pat. No. 6,502,821. Geometrically complex, three-dimensional components can be treated by spray application of a sound deadener composition in the form of an aqueous dispersion. Dispersions of this kind generally comprise a dispersed, viscoelastic polymer and inorganic fillers. Vibration-damping compositions based on water-based polymer dispersions and inorganic fillers along with further auxiliaries are described in EP 1520865, WO 2007/034933, EP 2420412, and WO 2012/010632 and in the European patent application with the application number 13179452.1. The quality of a sound deadener composition can be measured by measuring the flexural vibrations by the resonance curve method in accordance with EN ISO 6721-1:2011 and EN ISO 6721-3:1996. One measure of the vibration-damping effect is the loss factor tan delta. When sound deadener compositions based on viscoelastic polymers are used, the loss factor is temperature-dependent. The desire is for materials which result in a maximum loss factor in the temperature range in which the machinery or vehicles are typically operated, of between 0 and 40° C., for example.

In the case of sound deadener compositions based on aqueous systems, particular challenges are posed by the water absorption of the dried compositions on contact with moisture. Drying may be accompanied by unwanted blistering, the formation of larger or smaller pores, or unwanted expansion.

It was an object of the present invention to provide further materials having good or improved vibration-damping properties and, in particular, good drying behavior, minimal water absorption on the part of the dried compositions, and a very low porosity on the part of the dried composition. Good drying behavior is manifested in an extremely fine porosity and in an extremely low volume expansion during drying.

It has been found that the polymeric binders contained in known sound deadener compositions based on polymer dispersions can have their technical properties improved by specific setting of the molecular weight of the polymers.

It has been found that when certain polymer dispersions are used as binders, it is possible to provide sound deadener compositions having good vibration-damping properties, low water absorption, and good drying behavior.

The invention accordingly provides the use of a polymer dispersion for producing sound deadener compositions, the polymer dispersion comprising at least one polymer obtainable by emulsion polymerization of radically polymerizable monomers, and the polymer having a weight-average molecular weight of more than 100 000, preferably of more than 100 000 to 350 000. A preferred use is the use of the sound deadener composition of the invention for damping the vibration of vehicle bodywork parts.

The invention also provides a sound deadener composition comprising
(i) the polymer dispersion described in more detail herein;
(ii) inorganic fillers; and
(iii) optionally organic fillers.

The invention also provides the use of the sound deadener composition for vibration damping of bodywork parts of a vehicle or as a composition for underbody protection of a motor vehicle, and also a method for damping oscillations or vibrations of vehicle components, where
(1) a sound deadener composition of the invention is provided, and
(2) the sound deadener composition is applied to a vehicle component and dried.

The weight-average molecular weight is measured by means of gel permeation chromatography (GPC) by the method of size exclusion chromatography (SEC). The elution curve is converted into the molecular weight distribution curve with the aid of a polystyrene calibration curve. The parameters used for the measurement are stated below in the examples.

Principal monomers are monomers which account in total for more than 50 wt %, based on the sum total of all of the monomers of a polymer.

In the text below, the designation "(meth)acryl . . . " and similar designations is used as an abbreviating notation for "acryl . . . or methacryl . . . ". The expression "Cx alkyl(meth)acrylate" encompasses alkyl acrylates and alkyl methacrylates having x C atoms in the alkyl group. The polymer dispersions for use in accordance with the invention are dispersions of polymers in an aqueous medium. The aqueous medium may, for example, be exclusively water, or may alternatively be mixtures of water with a water-miscible solvent such as methanol, ethanol, or tetrahydrofuran. It is preferred not to use organic solvents. The solids contents of the dispersions are preferably from 15 to 75 wt %, more preferably from 40 to 60 wt %, more particularly greater than 50 wt %. The solids content may be realized for example through corresponding adjustment to the monomer amounts and/or to the amount of water used in the emulsion polymerization. The average size of the polymer particles dispersed in the aqueous dispersion is preferably less than 400 nm, more particularly less than 300 nm. With particular preference the average particle size is between 140 and 250 nm. By average particle size here is meant the $d_{50}$ of the particle size distribution—that is, 50 wt % of the entire mass of all the particles have a diameter smaller than the $d_{50}$. The particle size distribution can be determined in a known way using an analytical ultracentrifuge (W. Mächtle, Makromolekulare Chemie 185 (1984), pages 1025-1039). The pH of the polymer dispersion is set preferably to more than 4, more particularly to a pH of between 5 and 9.

The polymers prepared by emulsion polymerization are polymers obtainable by radical polymerization of ethylenically unsaturated compounds (monomers). The polymer is composed preferably to an extent of at least 40 wt % or at least 60 wt %, or at least 80 wt %, more preferably at least 90 wt % or 100 wt %, of one or more of the principal monomers described below. The principal monomers are preferably selected from C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

The nature and amount of the monomers are preferably such that the glass transition temperature of the polymer prepared by emulsion polymerization is in the range from −60° C. to less than or equal to 70° C., or in the range from −30° C. to less than or equal to 60° C., more preferably in the range from −15 to 50° C. The glass transition temperature may be determined in the form of what is called the "midpoint temperature" by means of differential scanning calorimetry (ASTM D 3418-08).

Suitable monomers are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. In particular, mixtures of the (meth)acrylic acid alkyl esters are suitable as well. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine, or bromine, preferably vinyl chloride and vinylidene chloride. Examples of vinyl ethers include vinyl methyl ether or vinyl isobutyl ether. Preferred vinyl ethers are those of alcohols comprising 1 to 4 C atoms. Suitable hydrocarbons having 4 to 8 C atoms and two olefinic double bonds are butadiene, isoprene, and chloroprene, for example.

Preferred principal monomers are $C_1$ to $C_{10}$ alkyl acrylates and $C_1$ to $C_{10}$ alkyl methacrylates, more particularly $C_1$ to $C_8$ alkyl acrylates and methacrylates, and vinylaromatics, especially styrene, and mixtures thereof. Especially preferred are methyl acrylate, methyl methacrylate, ethyl acrylate, n-butyl acrylate, n-hexyl acrylate, octyl acrylate, and 2-ethylhexyl acrylate, 2-propylheptyl acrylate, styrene, and also mixtures of these monomers. More particularly the polymers are composed to an extent of at least 60 wt %, more preferably at least 80 wt %, and very preferably at least 90 or at least 95 wt % of $C_1$ to $C_{10}$ alkyl (meth)acrylates.

Besides the principal monomers, the polymer may comprise other monomers, examples being ethylenically unsaturated monomers with carboxylic, sulfonic, or phosphonic acid groups (acid monomers). Carboxylic acid groups are preferred. Examples include acrylic acid, methacrylic acid, itaconic acid, maleic acid, or fumaric acid.

Further monomers are, for example, also monomers comprising hydroxyl groups, more particularly $C_1$-$C_{10}$ hydroxyalkyl (meth)acrylates or (meth)acrylamide. Other further monomers are phenyloxyethyl glycol mono(meth)acrylate, glycidyl (meth)acrylate, aminoalkyl (meth)acrylates such as 2-aminoethyl (meth)acrylate, for example. Alkyl groups have preferably from 1 to 20 C atoms.

In one embodiment the polymer is composed of
(a) 25 to 75 wt %, preferably 30 to 70 wt %, of at least one monomer which when polymerized as a homopolymer has a glass transition temperature of less than 0° C., preferably of less than −20° C., e.g., n-propyl acrylate, n-butyl acrylate, n-hexyl acrylate, 2-ethylhexyl acrylate;
(b) 24 to 75 wt %, preferably 29 to 70 wt %, of at least one monomer which when polymerized as a homopolymer has a glass transition temperature of greater than 0° C., preferably of greater than 50° C., e.g., methyl acrylate, tert-butyl acrylate, methyl methacrylate, ethyl methacrylate, n-butyl methacrylate, isobutyl methacrylate, tert-butyl methacrylate, acrylonitrile, methacrylonitrile, styrene, vinyl acetate, (meth)acrylamide; and
(c) 0 to 5 wt %, preferably 0.3 to 3 wt %, of at least one monomer different from the monomers (a) and (b) and having at least one acid group (acid monomers).

One particularly preferred polymer is composed of
(a) 25 to 75 wt % of n-butyl acrylate
(b) 24 to 75 wt % of methyl methacrylate
(c) 0.3 to 3 wt % of at least one acid monomer selected from acrylic acid, methacrylic acid, and a mixture thereof.

The polymers may be prepared by emulsion polymerization, the product then being an emulsion polymer. In the emulsion polymerization it is usual to use ionic and/or nonionic emulsifiers and/or protective colloids, and/or stabilizers, as interface-active compounds, in order to support the dispersing of the monomers in the aqueous medium. A comprehensive description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Emulsifiers contemplated are anionic, cationic, and nonionic emulsifiers. As accompanying interface-active substances it is preferred to use exclusively emulsifiers, whose molecular weights, in contrast to the protective colloids, are usually below 2000 g/mol. Where mixtures of interface-active substances are used, the individual components must, of course, be compatible with one another, something which in case of doubt can be verified using a few preliminary experiments. Preference is given to using anionic and non-ionic emulsifiers as interface-active substances. Suitable emulsifiers are, for example, ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$- to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one $C_8$-$C_{22}$ alkyl group.

Further suitable emulsifiers are compounds of the general formula in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 C atoms, or hydrogen, and more particularly having 6, 12, and 16 C atoms, with $R^5$ and $R^6$ not being both simultaneously hydrogen. X and Y are preferably sodium, potassium, or ammonium ions, with sodium being particularly preferred. Particularly advantageous are compounds in which X and Y are sodium, $R^5$ is a branched alkyl radical having 12 C atoms, and $R^6$ is hydrogen or $R^5$. Use is frequently made of technical mixtures which include a fraction of 50 to 90 wt % of the monoalkylated product, an example being Dowfax®2A1. Suitable emulsifiers are also found in Houben-Weyl, Methoden der organischen Chemie, Volume 14/1, Makromolekulare Stoffe [Macromolecular compounds], Georg Thieme Verlag, Stuttgart, 1961, pages 192 to 208. Emulsifier trade names are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Also suitable are copolymerizable emulsifiers which comprise a radically polymerizable, ethylenically unsaturated double bond, examples being reactive anionic emulsifiers such as Adeka® Resoap SR-10.

The emulsion polymerization takes place in general at 30 to 130, preferably 50 to 95° C. or 50 to less than 90° C. The polymerization medium may consist only of water, or of mixtures of water and liquids miscible therewith such as methanol. Preference is given to using just water. The emulsion polymerization may be carried out as a batch operation or in the form of a feed process, including staged or gradient regimes. Preference is given to the feed process, in which a portion of the polymerization batch is introduced as the initial charge and is heated to the polymerization temperature, polymerization is commenced, and the remainder of the polymerization batch is supplied to the polymerization zone, usually via a plurality of spatially separate feeds, of which one or more comprise the monomers in pure form or in emulsified form, the additions taking place continuously, in stages, or under a concentration of gradient, with the polymerization being maintained. For more effective setting of the particle size, for example, it is also possible in the polymerization to include a polymer seed in the initial charge.

The emulsion polymerization can be carried out in the presence of at least one protective colloid. This means that the protective colloids are included in the initial charge or supplied together with monomers to the polymerization vessel. They are preferably included in the initial emulsion polymerization charge, while any emulsifiers employed additionally may be supplied together with the monomers in the course of the polymerization as well.

For the emulsion polymerization it is possible to use the typical and known auxiliaries, such as water-soluble initiators and chain transfer agents, for example. Water-soluble initiators for the emulsion polymerization are, for example, ammonium salts and alkali metal salts of peroxydisulfuric acid, e.g., sodium peroxodisulfate, hydrogen peroxide, or organic peroxides, e.g., tert-butyl hydroperoxide. Also suitable are what are called reduction-oxidation (redox) initiator systems. The redox initiator systems are composed of at least one usually inorganic reducing agent and one organic or inorganic oxidizing agent. The oxidizing component comprises, for example, the initiators already specified above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and the salts thereof, or ascorbic acid. The redox initiator systems can be used together with soluble metal compounds whose metallic component is able to occur in a plurality of valence states.

Examples of typical redox initiator systems include ascorbic acid/iron(II) sulfate/sodium peroxydisulfate, tert-butyl hydroperoxide/sodium disulfite, tert-butyl hydroperoxide/Na-hydroxymethanesulfinic acid, or tert-butyl hydroperoxide/ascorbic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water that is acceptable in the dispersion, and the upper concentration by the solubility of the respective compound in water. In general the concentration is 0.1 to 30 wt %, preferably 0.5 to 20 wt %, more preferably 1.0 to 10 wt %, based on the solution. The amount of the initiators is generally 0.1 to 10 wt %, preferably 0.5 to 5 wt %, based on the monomers to be polymerized. It is also possible for two or more different initiators to be used for the emulsion polymerization. For the purpose of removing the residual monomers, it is typical for initiator to be added after the end of the actual emulsion polymerization as well.

In the polymerization it is possible to use chain transfer agents to regulate molecular weight, in amounts, for example, of 0 to 0.8 part by weight, based on 100 parts by weight of the monomers to be polymerized, thereby reducing the molar mass. Suitability is possessed, for example, by compounds having a thiol group such as tert-butyl mercaptan, thioglycolic esters, such as 2-ethylhexyl thioglycolate (EHTG), mercaptoethanol, mercaptopropyltrimethoxysilane, n-dodecyl mercaptan, or tert-dodecyl mercaptan (t-DMK). Preference is given to EHTG or t-DMK. It is additionally possible to use chain transfer agents without a thiol group, such as C6 to C20 hydrocarbons, for example, which form a pentadienyl radical when hydrogen is abstracted, an example being terpinolene. In one embodiment the emulsion polymer is prepared using 0.05 to 0.7 wt % or less than 0.4 wt %, based on the monomer amount, of at least one chain transfer agent to regulate molecular weight.

The polymers for use in accordance with the invention have defined weight-average molecular weights. It has emerged that polymers with a weight-average molecular weight of more than 100 000 lead to a significantly lower water absorption when used in sound deadener compositions. The polymers are high-molecular but preferably uncrosslinked or only slightly crosslinked. Molecular weights in accordance with the invention can be set using one or more of the following measures:

by carrying out the emulsion polymerization using chain transfer agents in an amount of less than 0.4 part by weight per 100 parts by weight of monomers, or using no chain transfer agents; and/or by carrying out the emulsion polymerization at relatively low temperatures, as for example at temperatures of less than 90° C.; and/or by carrying out the emulsion polymerization using initiators (e.g., sodium peroxodisulfate) in an amount of 0.1 to less than 0.7 part by weight per 100 parts by weight of monomers; and/or by using little or no crosslinking monomers (e.g., 1,4-butanediol diacrylate) during the emulsion polymerization, as for example using them in an amount of less than 0.2 part by weight per 100 parts by weight of monomers.

In one embodiment the emulsion polymerization takes place in one stage and/or without protective colloid.

In the emulsion polymerization, aqueous dispersions of the polymer are obtained with solids contents in general of 15 to 75 wt %, preferably of 40 to 75 wt %. For a high space/time yield of the reactor, dispersions with as high a solids content as possible are preferred. In order to be able to achieve solids contents >60 wt %, a bimodal or polymodal particle size ought to be set, since otherwise the viscosity becomes too high and the dispersion is no longer manageable. Producing a new particle generation can be accomplished, for example, by addition of seed (EP 81083), by addition of excess quantities of emulsifier, or by addition of miniemulsions. A further advantage associated with the low viscosity at high solids content is the improved coating behavior at high solids contents. Producing one or more new particle generations can be done at any desired point in time. This point in time is guided by the particle size distribution that is desired for a low viscosity.

In one embodiment the polymer has a core-shell morphology or is preparable by at least two-stage polymerization, with the glass transition temperature of the core-forming polymer (A) differing by at least 10° C., preferably by at least 15° C. or at least 20° C., as for example by 10 to 50° C., from the glass transition temperature of the shell-forming polymer (B), or with the glass transition temperature of the polymer (B) formed in the first polymerization stage differing from the glass transition temperature of the polymer formed in the second polymerization stage (A) by at least 10° C., preferably by at least 15° C. or at least 20° C., as for example by 10 to 50° C. This embodiment therefore relates to aqueous polymer dispersions in which the polymer particles have at least two polymer phases (A) and (B) which are different from one another and have different glass transition temperatures. An advantage of this is that sound deadener compositions produced accordingly possess vibration-damping activities within a larger temperature range. The glass transition temperature of the core is preferably greater than the glass transition temperature of the shell.

In the case of the core-shell particles, the surface of the core is covered wholly or at least partly with the shell-forming polymer. Core-shell particles preferably have an average particle diameter of 10 nm to 1 micrometer or 20 nm to 500 nm, measurable with a dynamic light-scattering photometer. Both polymer (A) and the polymer (B) different from it are preferably acrylate copolymers, with the nature and amount of the monomers being such as to ensure at least the minimum difference between the glass transition temperatures. Suitable acrylate copolymers for the formation of at least two-phase polymer particles are described in WO 2007/034933, EP 1520865, and DE19954619, for example.

Polymer dispersions with at least two-phase polymer particles are preferably obtainable by radical aqueous emulsion polymerization, comprising the following steps:
a) polymerizing a first monomer batch M1 to give a polymer P1 having a theoretical glass transition temperature Tg(1) (according to Fox) and
b) polymerizing a second monomer batch M2 to give a polymer P2 having a theoretical glass transition temperature Tg(2) (according to Fox), different from Tg(1), in the aqueous dispersion of the polymer P1,
with the use of at least one chain transfer reagent either during the polymerization of the monomer batch M1 or during the polymerization of the monomer batch M2, preferably.

A theoretic glass transition temperature is understood, here and below, to be the glass transition temperature Tg(1) or Tg(2), calculated according to Fox on the basis of the monomer composition of the monomer batch M1 and of the monomer batch M2, respectively. According to Fox (T. G. Fox, Bull. Am. Phys. Soc. (Ser. II) 1, 123 [1956] and Ullmann's Enzyklopädie der technischen Chemie, Weinheim (1980), pp. 17, 18), the glass transition temperature of copolymers of high molar masses is given in good approximation by $$1/Tg = x1/Tg(1) + x2/Tg(2) + \ldots + xn/Tg(n)$$

where $x1, x2, \ldots xn$ are the mass fractions $1, 2, \ldots, n$, and $Tg(1), Tg(2), \ldots, Tg(n)$ are the glass transition temperatures of the polymers constructed in each case only from one of the monomers $1, 2, \ldots, n$, in degrees Kelvin. The latter are known from, for example, Ullmann's Encyclopedia of Industrial Chemistry, VCH, Weinheim, vol. A 21 (1992) p. 169, or from J. Brandrup, E. H. Immergut, Polymer Handbook 3rd edn., J. Wiley, New York 1989.

With preference in accordance with the invention the monomer batch M2 is selected such that the theoretical glass transition temperature (according to Fox) of the resultant polymer phase P2 lies above the theoretical glass transition temperature of the polymer P1 prepared first. In that case the monomer batch M2 preferably has a composition which leads to a theoretical glass transition temperature Tg(2) for the polymer phase P2 that is above 30° C., preferably above 40° C., and more particularly in the range from 50 to 120° C. If Tg(2) is greater than Tg(1), the monomer batch M1 preferably has a monomer composition which leads to a theoretical glass transition temperature Tg(1) for the resulting polymer phase P1 that is in the range from −40 to +40° C., preferably in the range from −30 to +30° C., and very preferably in the range from −10 to +25° C. If Tg(1) is greater than Tg(2), the preferred glass transition temperatures of the polymer phase P1 are subject to the same statements as made above for P2 in the case where Tg(2) is greater than Tg(1). In that case, accordingly, the glass transition temperatures of the polymer phase P2 are subject to the statements made above for Tg(1).

In the polymer dispersions of the invention, the weight ratio of the polymer phases to one another is in the range from 20:1 to 1:20, preferably 9:1 to 1:9. The invention gives preference to those polymer dispersions in which the fraction of polymer phase having the low glass transition temperature is predominant. If, as preferred in accordance with the invention, P1 has the lower glass transition temperature, the ratio P1:P2 is situated in particular in the range from 1:1 to 5:1, and with particular preference in the range from 2:1 to 4:1. The weight ratios of the polymer phases P1 and P2 here correspond approximately to the proportions of the monomer batches M1 and M2. In the case of Tg(1) greater than Tg(2), the proportions P1:P2 are situated in particular in the range from 1:1 to 1:5 and more preferably in the range from 1:2 to 1:4.

The invention also provides a sound deadener composition comprising
(i) a polymer dispersion described in more detail above, comprising at least one polymer which is obtainable by emulsion polymerization of radically polymerizable monomers, is present in dispersion in water, and has a weight-average molecular weight of more than 100 000, preferably of more than 100 000 to 350 000;
(ii) inorganic fillers; and
(iii) optionally organic fillers.
The sound deadener composition preferably comprises
(a) 5 to 50 wt %, preferably 5 to 20 wt % of the polymer dispersion, the quantity figure being based on the solids content of the polymer dispersion, (b) 40 to 80 wt %, preferably 60 to 70 wt %, of inorganic fillers,
(c) 0 to 40 wt %, preferably 5 to 20 wt %, of organic fillers,
(d) 10 to 40 wt %, preferably 23 to 28 wt %, of water, and
(e) 0 to 10 or 0 to 5 wt %, preferably 0.1 to 3 wt %, of auxiliaries.

Suitable inorganic fillers are, for example, calcium carbonate, kaolin, mica, silica, chalk, microdolomite, finely ground quartz, mica, talc, clay, barium sulfate, argillaceous earth, iron oxide, titanium dioxide, glass powder, glass flakes, magnesium carbonate, aluminum hydroxide, bentonite, flyash, kieselguhr, perlite, carbon black, graphite, clay minerals, microdolomite, finely ground quartz, and mica. Preference is given to using fillers in flake form such as mica, for example, alone or in combination with customary inorganic pigments such as calcium carbonate, barium sulfate, kaolin, silica, chalk, or talc.

Suitable organic fillers are, for example, powder coating materials, examples being epoxy powder coating materials, polymer powders of, for example, ground solid ethylene/vinyl acetate copolymer (EVA) resins, dried acrylate dispersions, and polysaccharides.

Preference is given to using 50 to 700 or 100 to 550 parts by weight of inorganic filler per 100 parts by weight of polymer dispersion, with preference being given to using 30 to 150 or 40 to 120 parts by weight of fillers in flake form per 100 parts by weight of polymer dispersion.

Auxiliaries, which are used preferably at not less than 0.1 wt %, as for example from 0.1 to 10 wt % or from 0.2 to 5 wt % or from 0.2 to 3 wt %, are, for example, thickeners, resins, plasticizers, dispersants, cosolvents, stabilizers, wetting agents, preservatives, foam inhibitors, glass beads or plastics beads, hollow glass or plastics bodies, antifreeze agents, antioxidants, UV absorbers, epoxy powder coating materials, emulsifiers, siloxanes, organically modified siloxanes, and antistats. Of the auxiliaries it is possible to use one, two or more in combination. Suitable cosolvents are, for example, ethylene glycol, diethylene glycol, ethylene glycol alkyl ethers (e.g., Cellosolve® products), diethylene glycol alkyl ethers (e.g., Carbitol® products), carbitol acetate, butylcarbitol acetate, or mixtures thereof. Thickeners are, for example, polyvinyl alcohols, cellulose derivatives, polyacrylic acids, or acrylic acid/acrylate ester copolymers in amounts of, for example, 0.01 to 4 or of 0.05 to 1.5 or of 0.1 to 1 part by weight, based on 100 parts by weight of solid. Dispersants are, for example, sodium hexametaphosphate, sodium tripolyphosphates, or polycarboxylic acids. Antifreeze agents are, for example, ethylene glycol or propylene glycol. Foam inhibitors are, for example, silicones. Stabilizers are, for example, polyvalent metal compounds such as zinc oxide, zinc chloride, or zinc sulfate.

In one embodiment the sound deadener composition comprises no fluorinated compound.

The maximum of the loss factor tan delta for sound deadener compositions of the invention is preferably in the range from −30 to +60° C. Where core-shell particles or other particles having a multiphase particle structure are used, the different polymer phases having different glass transition temperatures, there are in general at least two maxima for the loss factor at not less than two different temperatures. In this case preferably all of the maxima of the loss factor are situated in the range from −30 to +60° C.

The invention also provides the use of a sound deadener composition of the invention for vibration damping of bodywork parts of a vehicle or as a composition for underbody protection on a motor vehicle, and also a method for damping oscillations or vibrations of vehicle components, where (1) a sound deadener composition described in more detail above, comprising a polymer dispersion for use in accordance with the invention, is provided, and
(2) the sound deadener composition is applied to a vehicle component and dried.

Application may take place in a usual way, as for example by spreading, rolling, or spraying. The amount applied is preferably from 1 to 7 kg/m² or from 2 to 6 kg/m² after drying. Drying may take place at ambient temperature or preferably by application of heat. The drying temperatures are preferably from 80 to 210° C. or from 90 to 180° C. or from 120 to 170° C.

The sound deadener composition may be employed, for example, in vehicles of all kinds, more particularly road motor vehicles, automobiles, rail vehicles, and also in boats, aircraft, electrical machinery, construction machinery, and buildings.

The sound deadener compositions of the invention have good performance properties in terms of high ease of application, good vibration-damping properties, good drying behavior, and low water absorption and good porosity on the part of the dried compositions.

EXAMPLES

Materials Used:
  EHTG 2-ethylhexyl thioglycolate
  n-BA n-butyl acrylate
  MMA methyl methacrylate
  SDS sodium dodecyl sulfate
  NaPS sodium peroxodisulfate Molecular Weight Measurement:
The weight-average molecular weight is measured by means of gel permeation chromatography (GPC) by the method of size extrusion chromatography (SEC). The elution curve is converted into the molecular weight distribution curve with the aid of a polystyrene calibration curve. Only the soluble fractions are subjected to measurement; insoluble gel fractions are removed by filtration. Measurement takes place using the following parameters:

Size Extrusion Chromatography:

| | |
|---|---|
| SEC apparatus | Agilent 1100 series |
| Eluent | THF + 0.1% trifluoroacetic acid |
| Column temperature | 35° C. |
| Flow rate | 1 mL/min |
| Injection | 100 μl |
| Concentration | 2 mg/mL |

The sample solution was filtered through Sartorius Minisart SRP 25 (0.2 μm).

The separating column combination used (Numbers 1, 2 and 3 in series one after another) was as follows:

| No. | Internal diameter mm | Length cm | Separating material | Exclusion limit g/mol | Column designation |
|---|---|---|---|---|---|
| 1 | 7.5 | 5 | Plgel 10μ Guard precolumn | | PLgel precolumn |
| 2 | 7.5 | 30 | Plgel 10 μm | 500-10 000 000 | PLgel MIXED-B (manufacturer Agilent) |

-continued

| No. | Internal diameter mm | Length cm | Separating material | Exclusion limit g/mol | Column designation |
|---|---|---|---|---|---|
| 3 | 7.5 | 30 | Plgel 10 μm | 500-10 000 000 | PLgel MIXED-B (manufacturer Agilent) |

Plate number of the combination at the stated flow rate: 40 000
Detector: DRI Agilent 1100UV Agilent 1100 VWD [254 nm].

Calibration takes place using narrow-range polystyrene standards from Polymer Laboratories with molecular weights M of 580 to 6 870 000, and with hexylbenzene (M=162). The values outside the elution range are extrapolated.

The distribution curves can be used to determine the average molar masses such as number average Mn (g/mol) or weight average Mw (g/mol).

Examples B1 to B7: Preparation of the Polymer Dispersions

The dispersions were prepared in accordance with the following recipe:

The reactor vessel is charged in succession with 188.10 g of fully demineralized water, 2.75 g of acrylic acid, and 2.64 g of 25% strength aqueous NH3 solution, and this charge is stirred at 150 rpm using an anchor stirrer, and heated to 92° C. At 92° C., 5 wt % of the emulsion feed is added over the course of 3 minutes, followed by stirring for a further 2 minutes. The initiator charge is then added over 2 minutes, followed by stirring for 3 minutes more. Subsequently the emulsion feed is run in over 3.5 h and the initiator feed over 4 h. Subsequently 10.95 g of fully demineralized water are added, and stirring is continued for 30 min. A further 15.90 g of fully demineralized water are added, and the batch is cooled to room temperature. The pH is adjusted to 7-9 with 10% strength aqueous NaOH solution.

The compositions of the emulsion feeds in grams are set out in the table below:

|  | B1 | B2 | B3 | B4 | B5 | B6 | B7 |
|---|---|---|---|---|---|---|---|
| Water | 196.38 | 180.02 | 181.83 | 183.15 | 184.09 | 184.53 | 191.26 |
| SDS (15%) | 16 | 14.67 | 14.67 | 14.67 | 14.67 | 14.67 | 14.67 |
| n-BA | 297 | 272.25 | 272.25 | 272.25 | 272.25 | 272.25 | 272.25 |
| MMA | 300 | 275 | 275 | 275 | 275 | 275 | 275 |
| EHTG | 0 | 0 | 2.20 | 3.85 | 4.95 | 5.50 | 13.75 |

The initiator charge in grams is set out in the table below:

|  | B1 | B2 | B3 | B4 | B5 | B6 | B7 |
|---|---|---|---|---|---|---|---|
| NaPS (7%) | 10.29 | 9.43 | 9.43 | 9.43 | 9.43 | 9.43 | 9.43 |

The amount of initiator solution in grams run in over 4 h in each case is set out in the table below:

|  | B1 | B2 | B3 | B4 | B5 | B6 | B7 |
|---|---|---|---|---|---|---|---|
| NaPS (7%) | 41.14 | 37.71 | 37.71 | 37.71 | 37.71 | 37.71 | 37.71 |

In order to prepare B1, the polymerization was carried out at 75° C. instead of 90° C. In the case of B1, furthermore, the reactor vessel was charged with 205.20 g of FD water, 3.0 g of acrylic acid, and 2.88 g of 25% strength aqueous NH3 solution.

The analytic data for the dispersions prepared, and also the weight-average molecular weights of the dispersions as determined by GPC, are compiled in the following table:

|  | B1 | B2 | B3 | B4 | B5 | B6 | B7 |
|---|---|---|---|---|---|---|---|
| SC | 54.1 | 54.6 | 55.2 | 54.7 | 54 | 54.8 | 53.6 |
| Mw | 413 000 | 330 000 | 87 000 | 50 000 | 41 600 | 42 700 | 15 900 |

Sound Deadener Composition Examples
Sound Deadener Composition A1:

The aqueous dispersion B1 is mixed at room temperature in a ratio of 25:75 (based on solids) with the fillers barium sulfate, chalk (Omyacarb® 20BG) and epoxy powder coating (EP corrosion primer jet black GL) in a ratio of 46.5:46.5:7 (based on solids) and also 4% of diethylene glycol, 0.6% of Viskalex® HV30 (thickener), 0.4% of Lumiten I-SC (emulsifier), 1% of Hexamoll DINCH (plasticizer), and 0.2% of EFKA 3580 (organically modified siloxane), by means of a dissolver-stirrer, and the mixture is subsequently homogenized in a Speedmixer.

Sound Deadener Composition A2:
As sound deadener composition A1, using dispersion B2 instead of B1.

Sound Deadener Composition A3:
As sound deadener composition A1, using dispersion B3 instead of B1.

Sound Deadener Composition A4:
As sound deadener composition A1, using dispersion B4 instead of B1.

Sound Deadener Composition A5:
As sound deadener composition A1, using dispersion B5 instead of B1.

Sound Deadener Composition A6:
As sound deadener composition A1, using dispersion B6 instead of B1.

Sound Deadener Composition A7:
As sound deadener composition A1, using dispersion B7 instead of B1.

Description of Mixing Assemblies:
Speedmixer: A DAC 400FVZ SpeedMixer from Hausschild is employed.

Dissolver-stirrer: The apparatus consists of a stirrer mechanism, a shaft driven by said mechanism, and a dissolver disk as stirring tool.

Performance Tests
Determination of Water Absorption:

The water absorption is determined in accordance with DIN EN ISO 62:2008. For this purpose, films of the prepared sound deadener compositions A1 to A7, with a thickness of about 2 mm and a side length of 25 mm in each case, are produced. The films are dried at 160° C. for 30 minutes and stored in demineralized water for 24 hours or for 7 days. A determination is made of the relative mass increase on storage, in percent.

Drying Behavior:

i: Blistering:

The sound deadener composition with a thickness of 3 mm and an edge length of 60 mm×100 mm is inspected after 30 minutes of drying at 160° C. In this inspection, the following scale of ratings is used:
1: no blisters
2: 2-3 small blisters
3: slight lifting of the composition
4: large blister, complete composition swells up ii: Porosity:

The sound deadener composition with a thickness of 3 mm and an edge length of 60 mm×100 mm is inspected after 30 minutes of drying at 160° C. In this inspection, the following scale of ratings is used:
1: uniform, fine pores
2: fine to medium pores
3: uniform, medium pores,
4: medium to large pores.

iii: Volume expansion:

The sound deadener composition with a thickness of 3 mm and an edge length of 60 mm×100 mm is dried at 160° C. for 30 minutes. Afterward, the thickness of the composition is measured again, and the absolute difference in height relative to the thickness prior to drying is ascertained, in mm.

Figure 1:
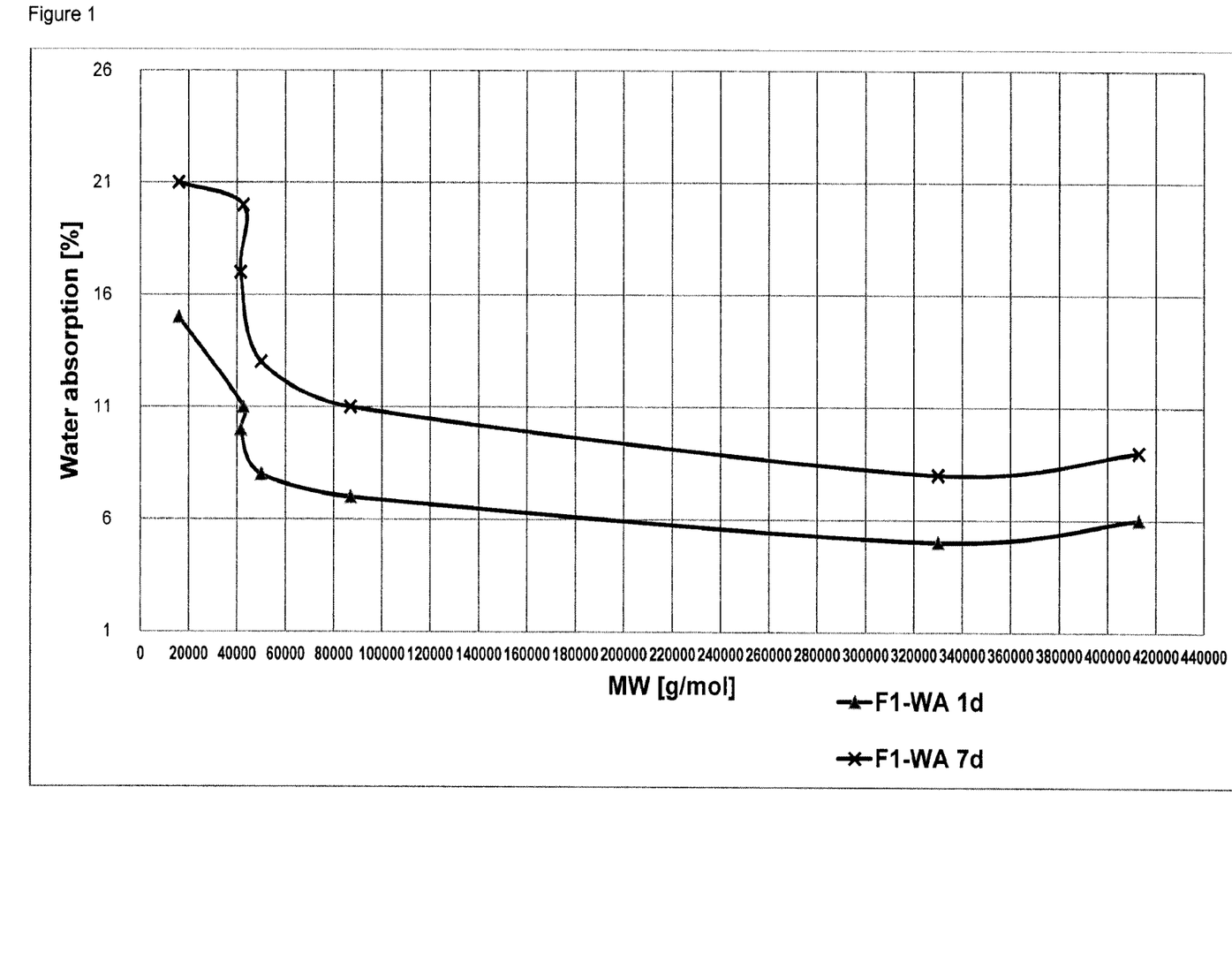
Figure 2:
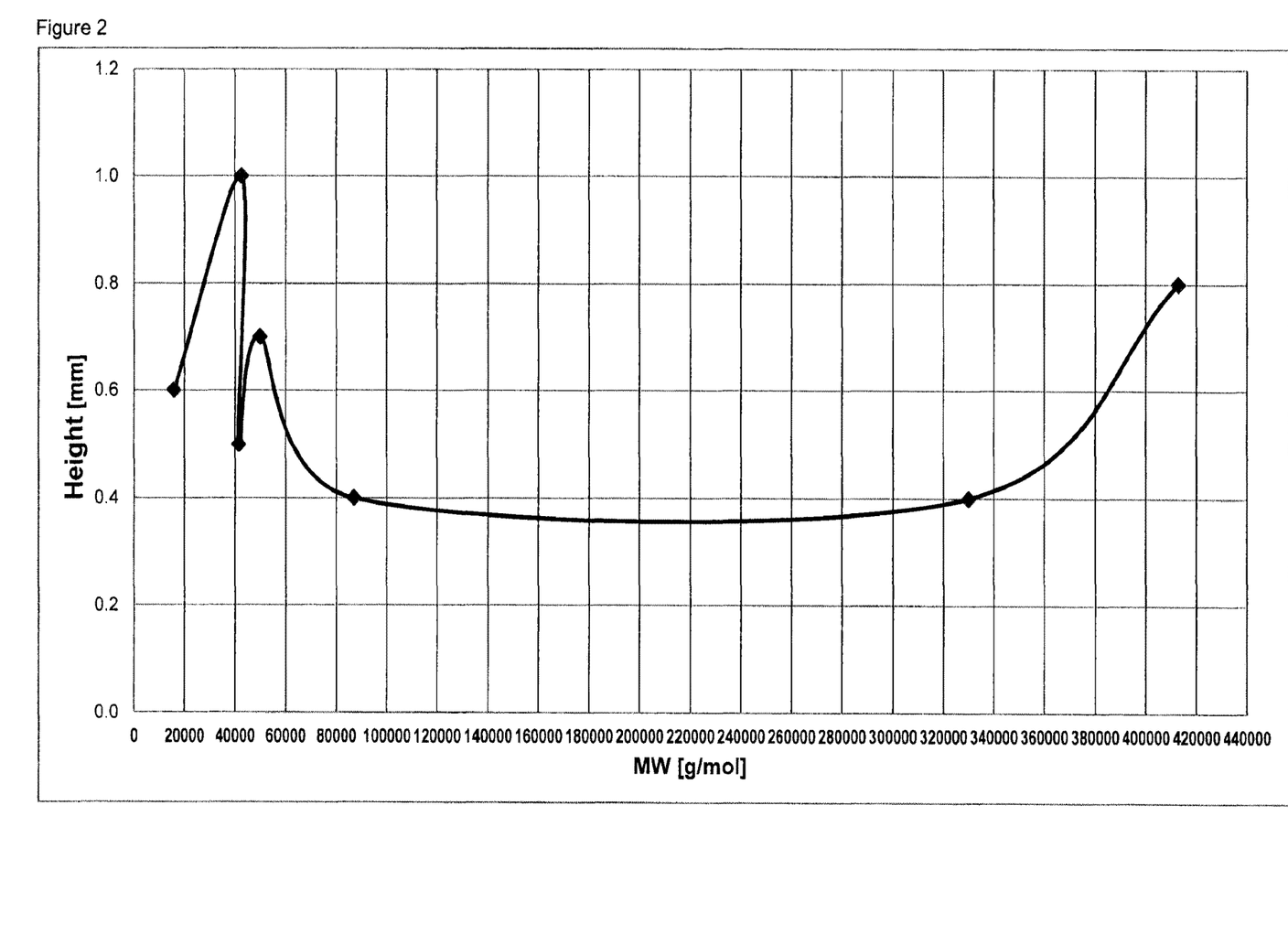

The results are set out in table 1 and in FIGS. 1 and 2.

FIG. 1 shows a graphical representation of the water absorption of sound deadener composition in coated form, in wt %, as a function of the weight-average molecular weight of the polymer binder. The lower line represents the water absorption after one day (24 h). The upper line represents the water absorption after 7 days.

FIG. 2 shows a graphical representation of the volume expansion of sound deadener compositions in coated form, in mm, as a function of the weight-average molecular weight of the polymer binder.

TABLE 1

Results of the performance tests:

| Example | Mw [1] | WA-1 d [%] [2] | WA-7 d [%] [3] | Porosity | Blistering | Volume expansion [mm] |
|---|---|---|---|---|---|---|
| A1 | 413 000 | 6 | 9 | 2 | 1 | 0.8 |
| A2 | 330 000 | 5 | 8 | 1 | 1 | 0.4 |
| A3 | 87 000 | 7 | 11 | 1 | 1 | 0.4 |
| A4 | 50 000 | 8 | 13 | 1 | 3 | 0.7 |
| A5 | 41 600 | 10 | 17 | 1 | 1 | 0.5 |
| A6 | 42 700 | 11 | 20 | 1 | 1 | 1.0 |
| A7 | 15 900 | 15 | 21 | 1 | 1 | 0.6 |

[1] weight-average molecular weight of the polymeric binder
[2] water absorption after one day (24 h)
[3] water absorption after 7 days The results show that depending on the molecular weight, with polymer dispersions of the invention it is possible to achieve good water absorption (WA-1d<7%; WA-7d<11%), a good porosity, and little blistering (less than 2) of the coating, and reduced volume expansion of the coating.

The invention claimed is:

1. A sound deadener composition, comprising:
(i) a dispersion comprising at least one copolymer having a weight-average molecular weight of more than 100,000 obtained by one stage emulsion copolymerization of radically copolymerizable monomers; and
(i) an inorganic filler;
wherein the radically copolymerizable monomers comprise:
25 to 75 wt % of at least one monomer which when polymerized as a homopolymer has a glass transition temperature of less than 0° C.;
25 to 75 wt % of at least one monomer which when polymerized as a homopolymer has a glass transition temperature of greater than 0° C. is selected from the group consisting of methyl acrylate, tert-butyl acrylate, methyl methacrylate, ethyl methacrylate, n-butyl methacrylate, isobutyl methacrylate, tert-butyl methacrylate, acrylonitrile, methacrylonitrile, vinyl acetate, and (meth)acrylamide; and
0 to 5 wt % of at least one monomer different from the monomers (a) and (b) and having at least one acid group;
wherein the at least one copolymer is not crosslinked.

2. The sound deadener composition according to claim 1, comprising;
(a) 5 to 50 wt % of the dispersion, the quantity figure being based on the solids content of the polymer dispersion;
(b) 40 to 80 wt % of inorganic fillers;
(c) 0 to 40 wt % of organic fillers;
(d) 10 to 40 wt % of water; and
(e) 0 to 10 wt % of auxiliaries.

3. The sound deadener composition according to claim 2, wherein the inorganic fillers are selected from the group consisting of kaolin, chalk, barium sulfate, carbon black, graphite, talk, clay minerals, microdolomite, finely group quartz, mica, and mixtures thereof;
the organic fillers when present, are selected from the group consisting of powder coating materials, polymer powders of ground solid ethylene/vinyl acetate copolymer resins, dried acrylate dispersions, polysaccharides, and mixtures thereof; and
the auxiliaries are present in an amount of not less than 0.1 wt % and are selected from the group consisting of thickeners, resins, plasticizers, dispersants, cosolvents, stabilizers, wetting agents, preservatives, foam inhibitors, glass beads, plastic beads, hollow glass bodies, hollow plastics bodies, antifreeze agents, antioxidants, UV absorbers, emulsifiers, siloxanes, organically modified siloxanes, antistats, and mixtures thereof.

4. The sound deadener composition according to claim 1, further comprising an organic filler.

5. The sound deadener composition according to claim 1, wherein the at least one copolymer obtained by emulsion polymerization, comprises:
(a) 25 to 75 wt % of n-butyl acrylate;
(b) 24 to 75 wt % of methyl methacrylate; and
(c) 0.3 to 3 wt % of at least one acid monomer selected from the group consisting of acrylic acid, methacrylic acid, and a mixture thereof.

6. The sound deadener composition according to claim 1, wherein the glass transition temperature of the polymer the at least one copolymer obtained by emulsion polymerization is in the range from −60° C. to less than or equal to +70° C.

* * * * *

UNITED STATES PATENT AND TRADEMARK OFFICE
CERTIFICATE OF CORRECTION

Page 1 of 2

PATENT NO. : 10,744,962 B2
APPLICATION NO. : 15/103522
DATED : August 18, 2020
INVENTOR(S) : Dimmer et al.

It is certified that error appears in the above-identified patent and that said Letters Patent is hereby corrected as shown below:

On the Title Page

Column 1, Item (51), under "Int. Cl.", Lines 1-9,
   *C09D 133/12*   (2006.01)
   *B60R 13/08*    (2006.01)
   *C08K 3/30*     (2006.01)
   *C09D 7/61*     (2018.01)
   *C08K 3/013*    (2018.01)
   *C08F 220/14*   (2006.01)
   *C08K 3/26*     (2006.01)
   *B05D 3/00*     (2006.01)
delete "*C08J 3/02*    (2006.01)" and insert -- *C09D 133/12*   (2006.01) --, therefor.

In the Specification

In Column 3, Line 21, delete "Versatic" and insert -- versatic --, therefor.

In Column 6, Line 14, delete "general" and insert -- general, --, therefor.

In Column 12, Lines 56-57, delete "Hausschild" and insert -- Hauschild --, therefor.

In Column 13, Line 22, delete "pores," and insert -- pores --, therefor.

In Column 13, Line 23, delete "pores." and insert -- pores --, therefor.

In the Claims

In Column 14, Claim 1, Line 7, delete "(i)" and insert -- (ii) --, therefor.

In Column 14, Claim 2, Line 25, delete "comprising;" and insert -- comprising: --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,744,962 B2

In Column 14, Claim 3, Line 42, delete "of not less than 0.1" and insert -- from 0.1 to 10 --, therefor.

In Column 14, Claim 6, Line 61, delete "of the polymer" and insert -- of --, therefor.